Jan. 4, 1966  P. E. HUMPHREY  3,226,985
RATE GYROSCOPE

Filed Aug. 6, 1962  2 Sheets-Sheet 1

INVENTOR.
PAUL E. HUMPHREY
BY
Knox & Knox

Jan. 4, 1966  P. E. HUMPHREY  3,226,985
RATE GYROSCOPE

Filed Aug. 6, 1962  2 Sheets-Sheet 2

INVENTOR.
PAUL E. HUMPHREY
BY
Knox & Knox

United States Patent Office 3,226,985
Patented Jan. 4, 1966

3,226,985
RATE GYROSCOPE
Paul E. Humphrey, 7665 Central, Lemon Grove, Calif.
Filed Aug. 6, 1962, Ser. No. 214,923
6 Claims. (Cl. 74—5.6)

The present invention relates generally to gyroscopic instruments and more particularly to a rate gyroscope.

The primary object of this invention is to provide a rate gyroscope of extremely simple construction utilizing a freely suspended gyro element with no mechanical connected to the drive or pickoff means and thus obviating the conventional springs, dampers and balancers.

Another object of this invention is to provide a rate gyroscope which can be of very small size yet accurate and sensitive, the operating power requirements being very low.

Another object of this invention is to provide a rate gyroscope in which balancing problems are minimized and the unit is especially insensitive to temperature changes, vibration and shock, these being important features in aerospace applications, to which the unit is particularly adaptable.

Still another object is to provide a rate gyroscope which has enhanced durability due to the fact that the rotor speed need not be great, and the simple mechanism has great resistance to shock and vibration encountered in use.

Finally, it is an object to provide a rate gyroscope of the aforementioned character which is simple and convenient to manufacture and which will give generally efficient and durable service over a wide range of operating conditions.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawings.

CONSTRUCTION

Figure 1:
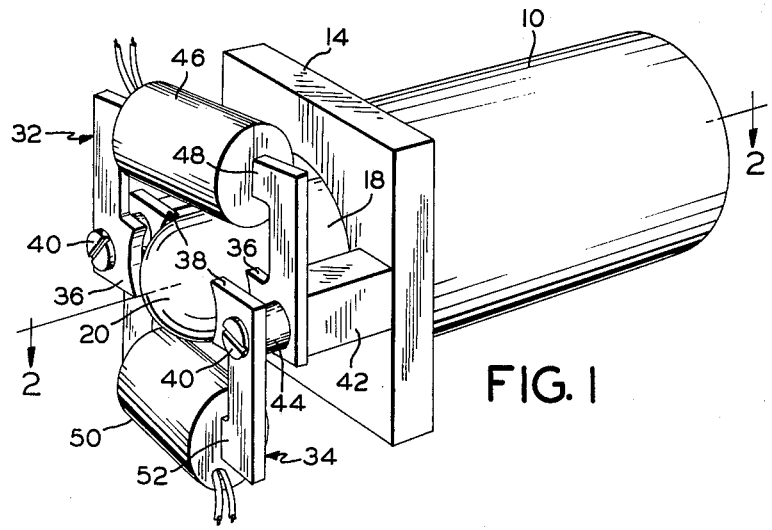
FIGURE 1 is a perspective view of the gyroscope unit.

The unit is driven by a motor 10, preferably an electric motor of suitable and readily available type, having a shaft 12 and being attached to a mounting plate 14. Fixed to shaft 12 is a hub 16 on which is mounted a chamber of paramagnetic material, which may conveniently be dome-shaped and take the form of a sleeve 18 having a closed end 20, which is illustrated as hemispherical, although the shape is not especially critical. The sleeve 18 is coaxial with shaft 12 and extends through the mounting plate 14. Inside the sleeve 18 is a rotor 22, preferably of spherical shape and having a ferromagnetic element, hereinafter represented as a diametrically disposed magnet 24 embedded therein. Magnet 24 is indicated as a bar magnet and can be of any cross section or, as an alternative, an annular ring magnet with diametrically opposed poles may be used. The sleeve 18 contains a suspension fluid 26 in which the rotor 22 is buoyantly suspended, the rotor is also preferably of paramagnetic material and will ordinarily be of plastic material giving the added advantage of lightness. To limit axial displacement of rotor 22, the hub 16 and closed end 20 have axially opposed centering bosses 28 and 30, respectively, between which the rotor is a free but close fit. Annular clearance between the rotor and sleeve is not critical but is kept small for practical purposes.

Figure 2:
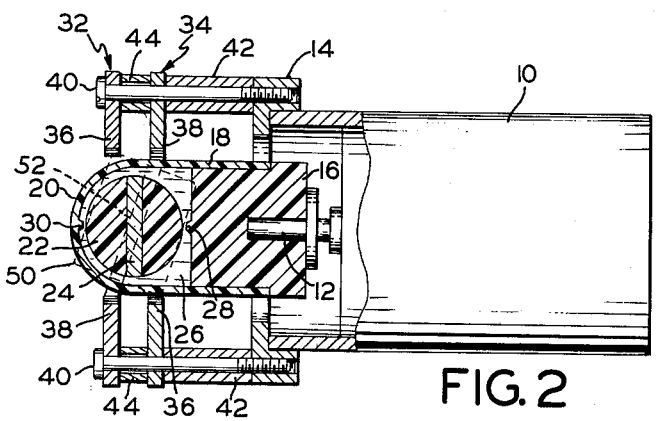
FIGURE 2 is a sectional view taken on line 2—2 of FIGURE 1.
Figure 3:
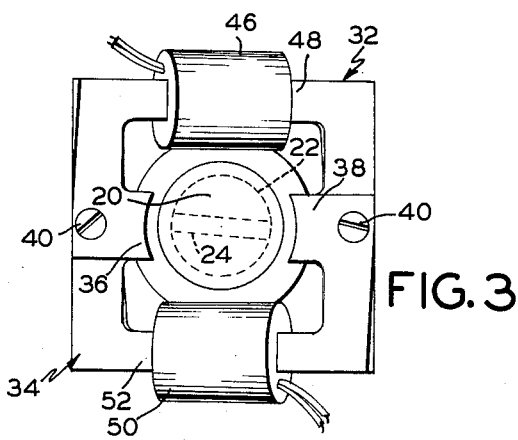
FIGURE 3 is a front elevation view of the unit.
Figure 4:
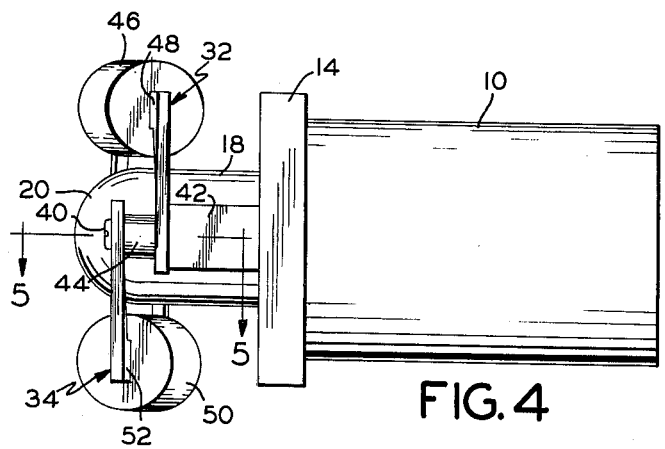
FIGURE 4 is a side elevation view thereof.
Figure 6:
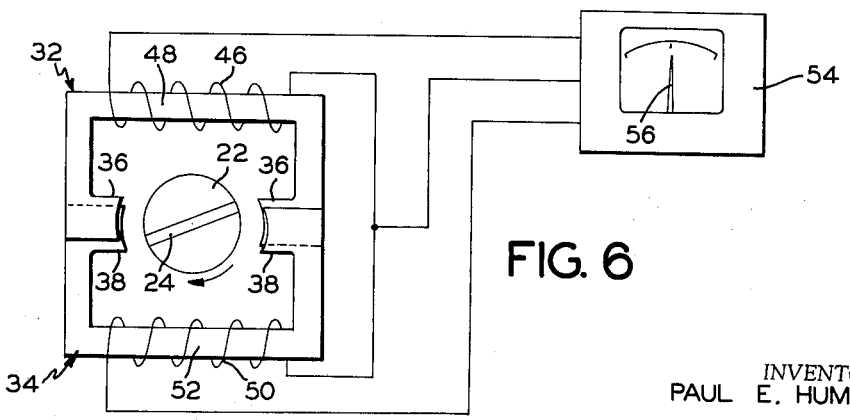
FIGURE 6 is a wiring diagram of the unit.

Straddling the sleeve 18 at the portion containing rotor 22 are a pair of generally U-shaped pole pieces 32 and 34, having inwardly opposed pairs of poles 36 and 38, respectively. The pole pieces 32 and 34 are inclined to the axis of sleeve 18 in opposite directions and crossed over so that the poles thereof are disposed in two axially spaced planes normal to the sleeve axis, with each pole 36 opposed to a pole 38. Pole pieces 32 and 34 are secured to mounting plate 14 by screws 40 and located by suitable spacers 42 and 44. Other means of supporting the pole pieces may be equally applicable, depending on whether the unit is to be fully enclosed or part of a composite assembly. The disposition of the pole pieces is such that, when the magnet 24 is perpendicular to the axis of sleeve 18, the plane of rotation of the magnet is equally spaced between the planes of the opposed poles, as in FIGURE 2. Pole piece 32 has a pick-off coil 46 wound around the connecting arm 48 between poles 36, and pole piece 34 has a similar pick-off coil 50 wound around its connecting arm 52. As illustrated in FIGURE 6, the coils 46 and 50 are connected to an indicator 54, the needle 56 of which will be moved in one direction or the other by a voltage in either coil.

OPERATION

When motor 10 is operated, the sleeve 18 will rotate and the friction of fluid 26 will cause the rotor 22 to rotate with the sleeve. Centrifugal action will cause the magnet 24 to rotate in a plane perpendicular to the axis of rotation, the magnet thus being the rotating gyroscopic mass which tends to remain in its initial plane of rotation according to well known gyroscopic principles.

The rate gyroscope is normally required to be sensitive to displacement of the rotational axis in one plane only. Since the erection characteristic of a gyroscopic mass suspended in fluid is such that the deviation is in the plane of rate input, the poles of pole pieces 32 and 34 must be oriented to sense deviation in the required direction. In an aircraft, missile, space vehicle, or the like the unit can be mounted in various positions to detect rate of turn in the required direction.

When rotating, the rotor 22 is axially centered in sleeve 18 by the fluid 26, which is denser than the rotor, so that said rotor is free of physical contact with any other portion of the unit except through the fluid. When the spin axis is moved, as by turning of the vehicle in which the unit is mounted, the angular momentum of the rotor 22 tends to hold the magnet 24 in its initial plane of rotation. However, the friction of fluid 26 will precess the rotor to its original relationship with the sleeve spin axis. Consequently, the plane of rotation of magnet 24 will lag, in the direction of turn, from a plane perpendicular to the spin axis. The amount of lag is directly proportional to the rate of turn input, at a constant spin speed, the angle of deviation between the plane of the magnet and its normal plane perpendicular to the spin axis thus representing a value of rate of turn.

Figure 5:
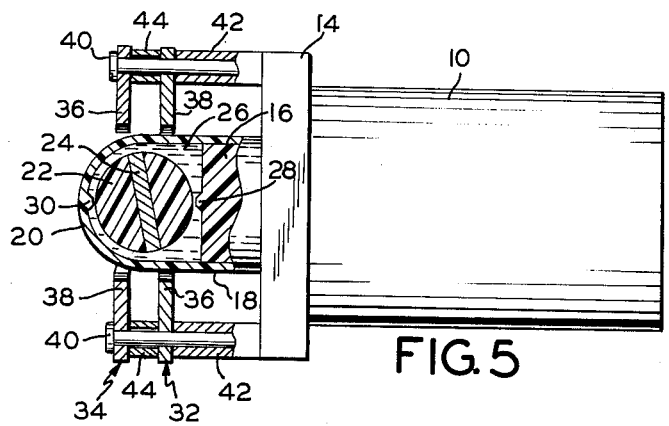
FIGURE 5 is a partially sectioned view taken on line 5—5 of FIGURE 4.

The angular deviation is detected by the pole pieces 32 and 34 in the manner illustrated in FIGURE 5. Magnet 24 is illustrated as being angularly offset from a plane perpendicular to the spin axis, and it will be evident that the opposite poles of the magnet are brought closer to both poles of one pole piece, in this instance the poles 36 of pole piece 32. At the same time the magnet is shifted away from poles 38 of pole piece 34, since the pole pieces are angularly staggered to place the two pole pieces of each one on opposite sides of the magnet plane of rotation. The resultant increase in the magnetic field in pole piece 32 causes a voltage to be induced in pick-off coil 46, which moves the needle 56 of indicator 54 in the appropriate direction of turn. The amount of deflection of the needle, representing the rate of turn, is proportional to the voltage which is, in turn, proportional to the angular deviation of the magnet plane of rotation. In effect, then the direction and rate of turn is represented by the difference and polarity of voltages in the pick-off coils 46 and 50, which vary with the displacement of rotor 22. In undisturbed rotation, the magnet 24 sweeps between the poles 36 and 38 symmetrically and there is no voltage difference between coils 46 and 50.

Other means of detecting rotor deviation may be used, such as optical pick-offs, resistance means with conductive fluid, or other types well known in the gyroscope art. However, the arrangement illustrated is very simple and the use of a magnet as the gyroscopic mass makes the system self-generating as to pick-off signals.

The rate gyroscope has no gimbals, mechanical moving parts, or mechanical connections between the gyro element and the pick-off means and requires no dampers or compensators. Balancing of the rotor is not especially critical, since any small discrepancies are absorbed by the suspension fluid. The unit may be made very small and light yet provide ample output for useful operation, rotational speed can be relatively low compared to conventional gyros and the power requirements are minimized. Adaption to different rate ranges is merely a matter of changing rotational speed, or the strength of the magnet, or the sensitivity of the pick-off coils, or combinations thereof. The simple structure can be very ruggedly built to withstand vibration, shock and changes of temperature, suitable motors having been developed for aerospace use, and the gyro portion itself being insensitive to such environmental changes. Another characteristic of the magnet and pole arrangement is the axial position of the rotor is maintained by the magnetic field so that the rotor does not normally contact the axial positioning bosses 28 and 30 except at starting. Maintenance is minimized since wear is virtually non-existent except in the motor, adjustment being limited to balancing the pick-off signals to provide a zero effective output when the unit is undisturbed.

It is understood that minor variation from the form of the invention disclosed herein may be made without departure from the spirit and scope of the invention, and that the specification and drawings are to be considered as merely illustrative rather than limiting. For example, additional pole and coil assemblies may be placed around the rotating element to make possible measurement of rate about more than one axis. In many systems rates about two perpendicular X and Y axes are needed. With this gyro only one instrument is required.

I claim:
1. A rate gyroscope comprising:
a rotatably mounted, closed chamber;
means to rotate said chamber;
a rotor enclosed and freely buoyantly suspended in said chamber; said rotor being free to rotate through 360 degrees independently of said chamber;
said rotor having therein a gyroscopic mass;
and pick-off means adjacent said chamber to detect deviation of the rotational plane of said gyroscopic mass from a plane perpendicular to the axis of rotation of the chamber.

2. A rate gyroscope, comprising:
a rotatably mounted closed chamber;
means to rotate said chamber;
a rotor enclosed and freely buoyantly suspended in said chamber; said rotor being free to rotate through 360 degrees independently of said chamber;
said rotor having therein a gyroscopic mass;
centering means in said chamber to limit the axial displacement of said rotor;
and pick-off means adjacent said chamber to detect deviation of the rotational plane of said gyroscopic mass from a plane perpendicular to the axis of rotation of the chamber.

3. A rate gyroscope, comprising:
a rotatably mounted, closed chamber;
means to rotate said chamber;
a rotor enclosed and freely buoyantly suspended in said chamber; said rotor being free to rotate through 360 degrees independently of said chamber;
a ferromagnetic element fixedly disposed in said rotor and constituting a gyroscopic mass;
axially spaced electromagnetic pick-off means adjacent said chamber to detect deviations of the rotational plane of said element from a plane perpendicular to the axis of rotation and provide output signals proportional to the said deviation.

4. A rate gyroscope, comprising:
a rotatably mounted, closed chamber;
means to rotate said chamber;
a rotor enclosed and freely buoyantly suspended in said chamber; said rotor being free to rotate through 360 degrees independently of said chamber;
a ferromagnetic element fixedly disposed in said rotor and constituting a gyroscopic mass;
axially spaced electromagnetic pick-off means adjacent said chamber to detect deviations of the rotational plane of said element from a plane perpendicular to the axis of rotation and provide output signals proportional to the said deviation;
and centering means in said chamber to limit the axial movement of said rotor relative to said pick-off means.

5. A rate gyroscope, comprising:
a rotatably mounted, closed chamber;
means to rotate said chamber;
a rotor enclosed and freely buoyantly suspended in said chamber; said rotor being free to rotate through 360 degrees independently of said chamber;
a ferromagnetic element fixedly disposed in said rotor and constituting a gyroscopic mass;
said rotor having limited axial motion in said chamber;
a pair of magnetically permeable pole pieces having axially spaced poles adjacent said chamber to detect deviations of the rotational plane of said element from a plane perpendicular to the axis of rotation;
and pick-off coils on said pole pieces to provide output signals proportional to deviations of said element.

6. A rate gyroscope, comprising:
a rotatably mounted, closed chamber;
means to rotate said chamber;
a rotor enclosed and freely buoyantly suspended in said chamber;
a ferromagnetic element fixedly disposed in said rotor and constituting a gyroscopic mass;
said rotor having limited axial motion in said chamber;
a pair of generally U-shaped, magnetically permeable pole pieces straddling said chamber and each having opposed poles adjacent the chamber;
said pole pieces being inclined in opposite directions and in cross over relation with the poles thereof axially spaced and one pole of each pole piece being opposed to a pole of the other to detect deviations of the rotational plane of said element from a plane perpendicular to the axis of rotation;

and pick-off coils on said pole pieces to provide output signals proportional to deviations of said element.

References Cited by the Examiner

UNITED STATES PATENTS

| | | | |
|---|---|---|---|
| 1,890,831 | 12/1932 | Smyth | 74—5 X |
| 1,986,807 | 1/1935 | Gillmor | 74—5.7 X |
| 2,815,584 | 12/1957 | Watson | 74—5.7 X |
| 2,850,905 | 9/1958 | Sedgfield | 74—5.7 |
| 2,857,767 | 10/1958 | Werndl | 74—5.37 |
| 2,871,706 | 2/1959 | Fischer et al. | 74—5.7 |
| 2,948,155 | 8/1960 | Burkham | 74—5.6 |

BROUGHTON G. DURHAM, *Primary Examiner.*

K. J. DOOD, P. W. SULLIVAN, *Assistant Examiners.*